US012804075B2

(12) United States Patent
Zgardovski et al.

(10) Patent No.: US 12,804,075 B2
(45) Date of Patent: Nov. 17, 2026

(54) DYNAMIC TELEPHONY LINE BALANCING FOR AUTOMATED OUTBOUND DIALING

(71) Applicant: Genesys Cloud Services, Inc., Menlo Park, CA (US)

(72) Inventors: Stanislav Zgardovski, Menlo Park, CA (US); Mark Stumpf, Indianapolis, IN (US); Chad McCormick, Menlo Park, CA (US); Rian Logan, Indianapolis, IN (US); Vladimir Krasilev, Menlo Park, CA (US); John Vetter, Indianapolis, IN (US)

(73) Assignee: Genesys Cloud Services, Inc., Menlo Park, CA (US)

( * ) Notice: Subject to any disclaimer, the term of this patent is extended or adjusted under 35 U.S.C. 154(b) by 107 days.

(21) Appl. No.: 18/819,447

(22) Filed: Aug. 29, 2024

(65) Prior Publication Data

US 2026/0067400 A1 Mar. 5, 2026

(51) Int. Cl.
*H04M 3/51* (2006.01)
*H04M 3/523* (2006.01)

(52) U.S. Cl.
CPC ....... *H04M 3/5158* (2013.01); *H04M 3/5141* (2013.01); *H04M 3/5183* (2013.01); *H04M 3/5232* (2013.01); *H04M 3/5238* (2013.01)

(58) Field of Classification Search
None
See application file for complete search history.

(56) References Cited

U.S. PATENT DOCUMENTS 6,449,358 B1 * 9/2002 Anisimov ........... H04M 3/5232 379/266.07
2010/0002863 A1 * 1/2010 Loftus ................ H04M 3/5158 379/265.02

* cited by examiner

*Primary Examiner* — Quynh H Nguyen
(74) *Attorney, Agent, or Firm* — Taft Stettinius & Hollister LLP

(57) ABSTRACT

A method for dynamic telephony line balancing for automated outbound dialing according to an embodiment includes determining a total number of available telephony lines to be dynamically balanced among a plurality of outbound dialing campaigns for automated outbound dialing by the contact center system, determining a number of telephony lines to be reserved for one or more outbound dialing campaigns, reducing the total number of available telephony lines to be dynamically balanced by the number of telephony lines to be reserved thereby resulting in a remaining number of available telephony lines, determining, for each line balanced outbound dialing campaign, a dynamic balancing weight assigned to the respective line balanced outbound dialing campaign, and assigning, for each line balanced outbound dialing campaign, a respective number of the remaining number of available telephony lines to the respective line balanced outbound dialing campaign based on the respective dynamic balancing weight.

17 Claims, 5 Drawing Sheets

Outbound Lines Distribution for Site

Outbound Lines 400

By Weight | Reserved Lines

| **Campaign Name** | **Weight** | **Lines Assigned** |
|---|---|---|
| Campaign-001 | 40 | 86 |
| Campaign-005 | 40 | 86 |
| Campaign-003 | 20 | 43 |
| Campaign-004 | 20 | 43 |
| Campaign-002 | 10 | 22 |
| | **Total:** | **280** |

Outbound Lines Distribution for Site

Outbound Lines 400

By Weight | Reserved Lines

| Campaign Name | Lines Configured | Lines Assigned |
|---|---|---|
| Campaign-007 | 50 | 50 |
| Campaign-008 | 20 | 20 |
| Campaign-006 | 50 | 50 |
| **Total:** | **120** | **120** |

DYNAMIC TELEPHONY LINE BALANCING FOR AUTOMATED OUTBOUND DIALING

BACKGROUND

Contact centers rely on agents to communicate with and respond to client inquiries, and contact centers will often simultaneously handle multiple automated outbound dialing campaigns in which the contact centers place outbound calls to contacts on behalf of the agents. In doing so, the various automated outbound dialing campaigns compete for the contact center's limited resources, including hardware resources such as telephony lines through which to place the calls. Accordingly, the contact centers traditionally may reserve a fixed number of telephony lines for each automated outbound dialing campaign.

SUMMARY

One embodiment is directed to a unique system, components, and methods for dynamic telephony line balancing for automated outbound dialing. Other embodiments are directed to apparatuses, systems, devices, hardware, methods, and combinations thereof for dynamic telephony line balancing for automated outbound dialing.

According to an embodiment, a method for dynamic telephony line balancing for automated outbound dialing may include determining, by a contact center system, a total number of available telephony lines to be dynamically balanced among a plurality of outbound dialing campaigns for automated outbound dialing by the contact center system, determining, by the contact center system, a number of telephony lines of the total number of available telephony lines to be reserved for one or more outbound dialing campaigns of the plurality of outbound dialing campaigns, reducing, by the contact center system, the total number of available telephony lines to be dynamically balanced by the number of telephony lines to be reserved for the one or more outbound dialing campaigns thereby resulting in a remaining number of available telephony lines, determining, by the contact center system and for each line balanced outbound dialing campaign of the plurality of outbound dialing campaigns, a dynamic balancing weight assigned to the respective line balanced outbound dialing campaign, and assigning, by the contact center system and for each line balanced outbound dialing campaign of the plurality of outbound dialing campaigns, a respective number of the remaining number of available telephony lines to the respective line balanced outbound dialing campaign based on the dynamic balancing weight assigned to the respective line balanced outbound dialing campaign.

In some embodiments, determining the number of telephony lines of the total number of available telephony lines to be reserved for the one or more outbound dialing campaigns may include determining, for each fixed line outbound dialing campaign of the plurality of outbound dialing campaigns, a respective number of telephony lines to reserve for the respective fixed line outbound dialing campaign.

In some embodiments, the number of telephony lines to be reserved for the one or more outbound dialing campaigns may be nonzero.

In some embodiments, the method may further include determining, by the contact center system, whether to perform telephony line rebalancing based on one or more campaign conditions of the plurality of outbound dialing campaigns, and rebalancing, by the contact center system, assignments of the total number of the available telephony lines to the plurality of the outbound dialing campaigns in response to determining to perform telephony line rebalancing.

In some embodiments, the one or more campaign conditions may include a campaign condition associated with a current time and/or a current day.

In some embodiments, the one or more campaign conditions may include a campaign condition associated with a number of contacts called by a respective outbound dialing campaign of the plurality of outbound dialing campaigns.

In some embodiments, the one or more campaign conditions may include a campaign condition associated with a number of one of successful outcomes, failed outcomes, or neutral outcomes achieved by a respective outbound dialing campaign of the plurality of outbound dialing campaigns.

In some embodiments, the one or more campaign conditions may include a campaign condition associated with a number of contact center agents currently available to handle outbound calls for one or more of the plurality of outbound dialing campaigns.

In some embodiments, rebalancing the assignments of the total number of the available telephony lines to the plurality of the outbound dialing campaigns may include modifying at least one dynamic balancing weight of a respective outbound dialing campaign of the plurality of outbound dialing campaigns.

In some embodiments, rebalancing the assignments of the total number of the available telephony lines to the plurality of the outbound dialing campaigns may include modifying the number of telephony lines of the total number of available telephony lines to be reserved for the one or more outbound dialing campaigns of the plurality of outbound dialing campaigns.

In some embodiments, rebalancing the assignments of the total number of the available telephony lines to the plurality of the outbound dialing campaigns may include modifying the one or more outbound dialing campaigns of the plurality of outbound dialing campaigns for which the number of telephony lines of the total number of available telephony lines are to be reserved.

In some embodiments, the method may further include automatically placing, by the contact center system, outbound calls on behalf of contact center agents to contacts identified by the plurality of line balanced outbound dialing campaigns in response to assigning the remaining number of available telephony lines.

In some embodiments, assigning the respective number of the remaining number of available telephony lines to the respective line balanced outbound dialing campaign based on the dynamic balancing weight assigned to the respective line balanced outbound dialing campaign may include assigning the remaining number of available telephony lines to the line balanced outbound dialing campaigns proportionally based on the dynamic balancing weights of the line balanced outbound dialing campaigns.

In some embodiments, the dynamic balancing weight assigned to the respective line balanced outbound dialing campaign may be modifiable by an administrator of the contact center system for each of the plurality of outbound dialing campaigns.

In some embodiments, the number of telephony lines reserved for each of the plurality of outbound dialing campaigns may be modifiable by an administrator of the contact center system.

According to another embodiment, a contact center system for dynamic telephony line balancing for automated outbound dialing may include at least one processor and at least one memory comprising a plurality of instructions stored thereon that, in response to execution by the at least one processor, causes the contact center system to determine a total number of available telephony lines to be dynamically balanced among a plurality of outbound dialing campaigns for automated outbound dialing by the contact center system, determine a number of telephony lines of the total number of available telephony lines to be reserved for one or more outbound dialing campaigns of the plurality of outbound dialing campaigns, reduce the total number of available telephony lines to be dynamically balanced by the number of telephony lines to be reserved for the one or more outbound dialing campaigns thereby resulting in a remaining number of available telephony lines, determine, for each line balanced outbound dialing campaign of the plurality of outbound dialing campaigns, a dynamic balancing weight assigned to the respective line balanced outbound dialing campaign, and assign, for each line balanced outbound dialing campaign of the plurality of outbound dialing campaigns, a respective number of the remaining number of available telephony lines to the respective line balanced outbound dialing campaign based on the dynamic balancing weight assigned to the respective line balanced outbound dialing campaign.

In some embodiments, to determine the number of telephony lines of the total number of available telephony lines to be reserved for the one or more outbound dialing campaigns may include to determine, for each fixed line outbound dialing campaign of the plurality of outbound dialing campaigns, a respective number of telephony lines to reserve for the respective fixed line outbound dialing campaign.

In some embodiments, the plurality of instructions may further cause the contact center system to determine whether to perform telephony line rebalancing based on one or more campaign conditions of the plurality of outbound dialing campaigns, and rebalance assignments of the total number of the available telephony lines to the plurality of the outbound dialing campaigns in response to a determination to perform telephony line rebalancing.

In some embodiments, to rebalance the assignments of the total number of the available telephony lines to the plurality of the outbound dialing campaigns may include to modify at least one dynamic balancing weight of a respective outbound dialing campaign of the plurality of outbound dialing campaigns.

In some embodiments, the plurality of instructions may further cause the contact center system to automatically place outbound calls on behalf of contact center agents to contacts identified by the plurality of line balanced outbound dialing campaigns in response to assignment of the remaining number of available telephony lines.

This summary is not intended to identify key or essential features of the claimed subject matter, nor is it intended to be used as an aid in limiting the scope of the claimed subject matter. Further embodiments, forms, features, and aspects of the present application shall become apparent from the description and figures provided herewith.

BRIEF DESCRIPTION OF THE DRAWINGS

The concepts described herein are illustrative by way of example and not by way of limitation in the accompanying figures. For simplicity and clarity of illustration, elements illustrated in the figures are not necessarily drawn to scale. Where considered appropriate, references labels have been repeated among the figures to indicate corresponding or analogous elements.

DETAILED DESCRIPTION

Figure 1:
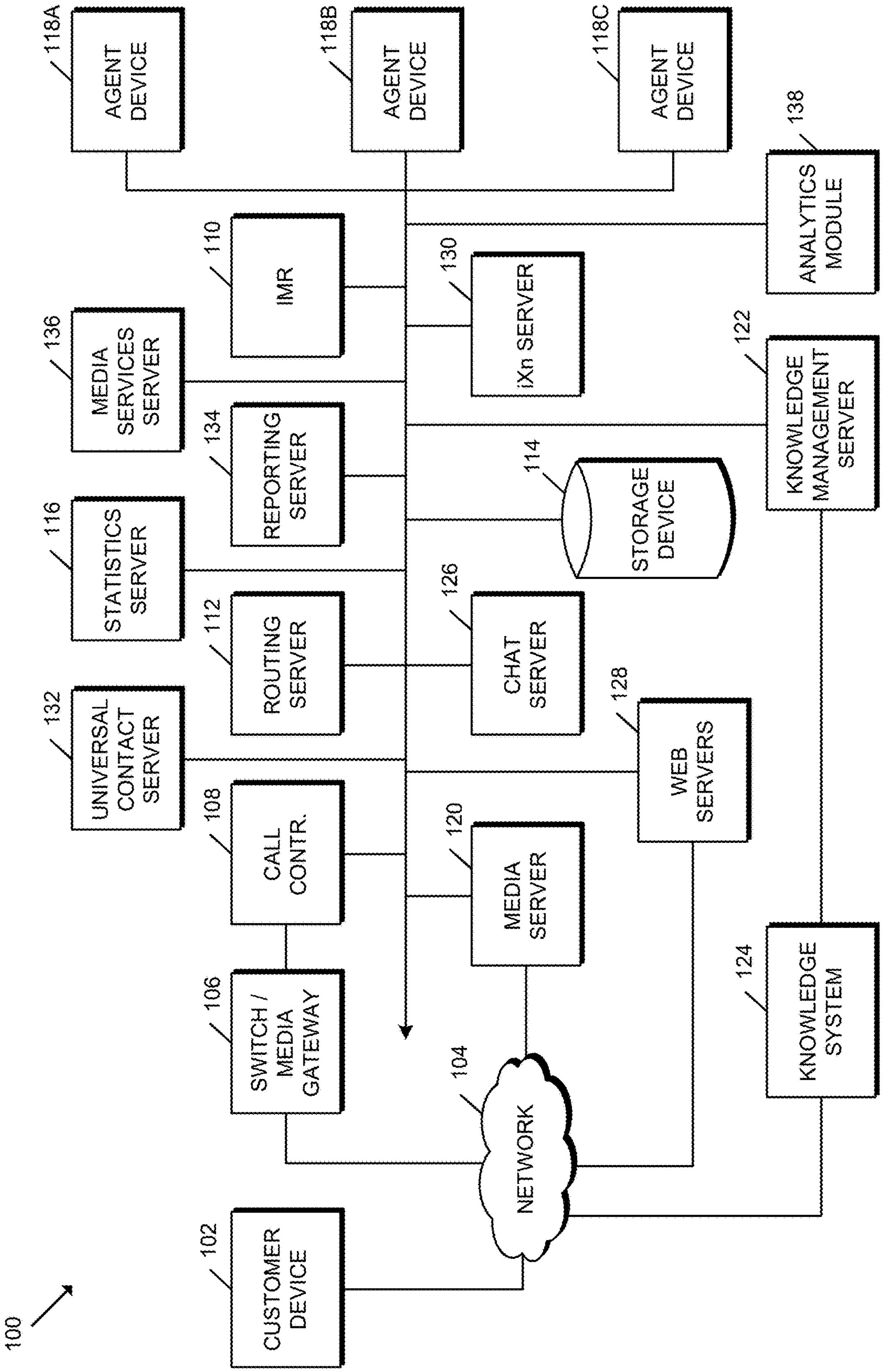
FIG. 1 depicts a simplified block diagram of at least one embodiment of a contact center system.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should be further appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described. Further, particular features, structures, or characteristics may be combined in any suitable combinations and/or sub-combinations in various embodiments.

Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

The disclosed embodiments may, in some cases, be implemented in hardware, firmware, software, or a combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may not be included or may be combined with other features.

Contact centers often simultaneously handle multiple automated outbound dialing campaigns in which the contact centers place outbound calls to contacts on behalf of the agents. In doing so, the various automated outbound dialing campaigns compete for the contact center's limited resources, including hardware resources such as telephony lines through which to place the calls. It should be appreciated that the technologies described herein include improvements to telephony line distribution, for example, by providing mechanisms for dynamic telephony line balancing for automated outbound dialing. As described below, the contact center may leverage various administrator-provided weights, fixed telephony lines, and/or campaign conditions for each of the automated outbound dialing campaigns to dynamically assign telephony lines to those campaigns and adjust the assignments over time based on the real-time circumstances of the contact center.

Referring now to FIG. 1, a simplified block diagram of at least one embodiment of a communications infrastructure and/or content center system, which may be used in conjunction with one or more of the embodiments described herein, is shown. The contact center system 100 may be embodied as any system capable of providing contact center services (e.g., call center services, chat center services, SMS center services, etc.) to an end user and otherwise performing the functions described herein. The illustrative contact center system 100 includes a customer device 102, a network 104, a switch/media gateway 106, a call controller 108, an interactive media response (IMR) server 110, a routing server 112, a storage device 114, a statistics server 116, agent devices 118A, 118B, 118C, a media server 120, a knowledge management server 122, a knowledge system 124, chat server 126, web servers 128, an interaction (iXn) server 130, a universal contact server 132, a reporting server 134, a media services server 136, and an analytics module 138. Although only one customer device 102, one network 104, one switch/media gateway 106, one call controller 108, one IMR server 110, one routing server 112, one storage device 114, one statistics server 116, one media server 120, one knowledge management server 122, one knowledge system 124, one chat server 126, one iXn server 130, one universal contact server 132, one reporting server 134, one media services server 136, and one analytics module 138 are shown in the illustrative embodiment of FIG. 1, the contact center system 100 may include multiple customer devices 102, networks 104, switch/media gateways 106, call controllers 108, IMR servers 110, routing servers 112, storage devices 114, statistics servers 116, media servers 120, knowledge management servers 122, knowledge systems 124, chat servers 126, iXn servers 130, universal contact servers 132, reporting servers 134, media services servers 136, and/or analytics modules 138 in other embodiments. Further, in some embodiments, one or more of the components described herein may be excluded from the system 100, one or more of the components described as being independent may form a portion of another component, and/or one or more of the component described as forming a portion of another component may be independent.

It should be understood that the term "contact center system" is used herein to refer to the system depicted in FIG. 1 and/or the components thereof, while the term "contact center" is used more generally to refer to contact center systems, customer service providers operating those systems, and/or the organizations or enterprises associated therewith. Thus, unless otherwise specifically limited, the term "contact center" refers generally to a contact center system (such as the contact center system 100), the associated customer service provider (such as a particular customer service provider/agent providing customer services through the contact center system 100), as well as the organization or enterprise on behalf of which those customer services are being provided.

By way of background, customer service providers may offer many types of services through contact centers. Such contact centers may be staffed with employees or customer service agents (or simply "agents"), with the agents serving as an interface between a company, enterprise, government agency, or organization (hereinafter referred to interchangeably as an "organization" or "enterprise") and persons, such as users, individuals, or customers (hereinafter referred to interchangeably as "individuals," "customers," or "contact center clients"). For example, the agents at a contact center may assist customers in making purchasing decisions, receiving orders, or solving problems with products or services already received. Within a contact center, such interactions between contact center agents and outside entities or customers may be conducted over a variety of communication channels, such as, for example, via voice (e.g., telephone calls or voice over IP or VOIP calls), video (e.g., video conferencing), text (e.g., emails and text chat), screen sharing, co-browsing, and/or other communication channels.

Operationally, contact centers generally strive to provide quality services to customers while minimizing costs. For example, one way for a contact center to operate is to handle every customer interaction with a live agent. While this approach may score well in terms of the service quality, it likely would also be prohibitively expensive due to the high cost of agent labor. Because of this, most contact centers utilize some level of automated processes in place of live agents, such as, for example, interactive voice response (IVR) systems, interactive media response (IMR) systems, internet robots or "bots," automated chat modules or "chatbots," and/or other automated processed. In many cases, this has proven to be a successful strategy, as automated processes can be highly efficient in handling certain types of interactions and effective at decreasing the need for live agents. Such automation allows contact centers to target the use of human agents for the more difficult customer interactions, while the automated processes handle the more repetitive or routine tasks. Further, automated processes can be structured in a way that optimizes efficiency and promotes repeatability. Whereas a human or live agent may forget to ask certain questions or follow-up on particular details, such mistakes are typically avoided through the use of automated processes. While customer service providers are increasingly relying on automated processes to interact with customers, the use of such technologies by customers remains far less developed. Thus, while IVR systems, IMR systems, and/or bots are used to automate portions of the interaction on the contact center-side of an interaction, the actions on the customer-side remain for the customer to perform manually.

It should be appreciated that the contact center system 100 may be used by a customer service provider to provide various types of services to customers. For example, the contact center system 100 may be used to engage and manage interactions in which automated processes (or bots) or human agents communicate with customers. As should be understood, the contact center system 100 may be an in-house facility to a business or enterprise for performing the functions of sales and customer service relative to products and services available through the enterprise. In another embodiment, the contact center system 100 may be operated by a third-party service provider that contracts to provide services for another organization. Further, the contact center system 100 may be deployed on equipment dedicated to the enterprise or third-party service provider, and/or deployed in a remote computing environment such as, for example, a private or public cloud environment with infrastructure for supporting multiple contact centers for multiple enterprises. The contact center system 100 may include software applications or programs, which may be executed on premises or remotely or some combination thereof. It should further be appreciated that the various components of the contact center system 100 may be distributed across various geographic locations and not necessarily contained in a single location or computing environment.

It should further be understood that, unless otherwise specifically limited, any of the computing elements of the present invention may be implemented in cloud-based or cloud computing environments. As used herein and further described below in reference to the computing device 200, "cloud computing"—or, simply, the "cloud"—is defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. Cloud computing can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.). Often referred to as a "serverless architecture," a cloud execution model generally includes a service provider dynamically managing an allocation and provisioning of remote servers for achieving a desired functionality.

Figure 2:
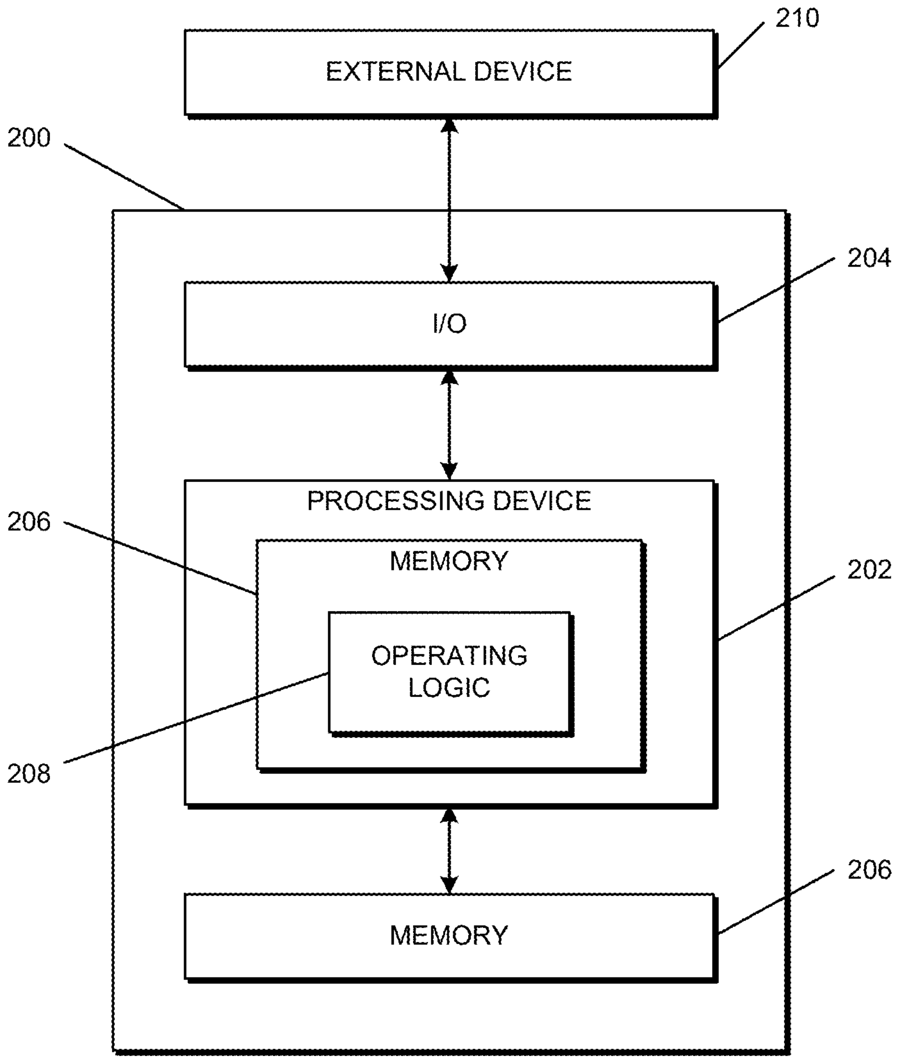
FIG. 2 is a simplified block diagram of at least one embodiment of a computing device.

It should be understood that any of the computer-implemented components, modules, or servers described in relation to FIG. 1 may be implemented via one or more types of computing devices, such as, for example, the computing device 200 of FIG. 2. As will be seen, the contact center system 100 generally manages resources (e.g., personnel, computers, telecommunication equipment, etc.) to enable delivery of services via telephone, email, chat, or other communication mechanisms. Such services may vary depending on the type of contact center and, for example, may include customer service, help desk functionality, emergency response, telemarketing, order taking, and/or other characteristics.

Customers desiring to receive services from the contact center system 100 may initiate inbound communications (e.g., telephone calls, emails, chats, etc.) to the contact center system 100 via a customer device 102. While FIG. 1 shows one such customer device—i.e., customer device 102—it should be understood that any number of customer devices 102 may be present. The customer devices 102, for example, may be a communication device, such as a telephone, smart phone, computer, tablet, or laptop. In accordance with functionality described herein, customers may generally use the customer devices 102 to initiate, manage, and conduct communications with the contact center system 100, such as telephone calls, emails, chats, text messages, web-browsing sessions, and other multi-media transactions.

Inbound and outbound communications from and to the customer devices 102 may traverse the network 104, with the nature of the network typically depending on the type of customer device being used and the form of communication. As an example, the network 104 may include a communication network of telephone, cellular, and/or data services. The network 104 may be a private or public switched telephone network (PSTN), local area network (LAN), private wide area network (WAN), and/or public WAN such as the Internet. Further, the network 104 may include a wireless carrier network including a code division multiple access (CDMA) network, global system for mobile communications (GSM) network, or any wireless network/technology conventional in the art, including but not limited to 3G, 4G, LTE, 5G, etc.

The switch/media gateway 106 may be coupled to the network 104 for receiving and transmitting telephone calls between customers and the contact center system 100. The switch/media gateway 106 may include a telephone or communication switch configured to function as a central switch for agent level routing within the center. The switch may be a hardware switching system or implemented via software. For example, the switch 106 may include an automatic call distributor, a private branch exchange (PBX), an IP-based software switch, and/or any other switch with specialized hardware and software configured to receive Internet-sourced interactions and/or telephone network-sourced interactions from a customer, and route those interactions to, for example, one of the agent devices 118. Thus, in general, the switch/media gateway 106 establishes a voice connection between the customer and the agent by establishing a connection between the customer device 102 and agent device 118.

As further shown, the switch/media gateway 106 may be coupled to the call controller 108 which, for example, serves as an adapter or interface between the switch and the other routing, monitoring, and communication-handling components of the contact center system 100. The call controller 108 may be configured to process PSTN calls, VOIP calls, and/or other types of calls. For example, the call controller 108 may include computer-telephone integration (CTI) software for interfacing with the switch/media gateway and other components. The call controller 108 may include a session initiation protocol (SIP) server for processing SIP calls. The call controller 108 may also extract data about an incoming interaction, such as the customer's telephone number, IP address, or email address, and then communicate these with other contact center components in processing the interaction.

The interactive media response (IMR) server 110 may be configured to enable self-help or virtual assistant functionality. Specifically, the IMR server 110 may be similar to an interactive voice response (IVR) server, except that the IMR server 110 is not restricted to voice and may also cover a variety of media channels. In an example illustrating voice, the IMR server 110 may be configured with an IMR script for querying customers on their needs. For example, a contact center for a bank may instruct customers via the IMR script to "press 1" if they wish to retrieve their account balance. Through continued interaction with the IMR server 110, customers may receive service without needing to speak with an agent. The IMR server 110 may also be configured to ascertain why a customer is contacting the contact center so that the communication may be routed to the appropriate resource. The IMR configuration may be performed through the use of a self-service and/or assisted service tool which comprises a web-based tool for developing IVR applications and routing applications running in the contact center environment.

The routing server 112 may function to route incoming interactions. For example, once it is determined that an inbound communication should be handled by a human agent, functionality within the routing server 112 may select the most appropriate agent and route the communication thereto. This agent selection may be based on which available agent is best suited for handling the communication. More specifically, the selection of appropriate agent may be based on a routing strategy or algorithm that is implemented by the routing server 112. In doing this, the routing server 112 may query data that is relevant to the incoming interaction, for example, data relating to the particular customer, available agents, and the type of interaction, which, as described herein, may be stored in particular databases. Once the agent is selected, the routing server 112 may interact with the call controller 108 to route (i.e., connect) the incoming interaction to the corresponding agent device 118. As part of this connection, information about the customer may be provided to the selected agent via their agent device 118. This information is intended to enhance the service the agent is able to provide to the customer.

It should be appreciated that the contact center system 100 may include one or more mass storage devices—represented generally by the storage device 114—for storing data in one or more databases relevant to the functioning of the contact center. For example, the storage device 114 may store customer data that is maintained in a customer database. Such customer data may include, for example, customer profiles, contact information, service level agreement (SLA), and interaction history (e.g., details of previous interactions with a particular customer, including the nature of previous interactions, disposition data, wait time, handle time, and actions taken by the contact center to resolve customer issues). As another example, the storage device 114 may store agent data in an agent database. Agent data maintained by the contact center system 100 may include, for example, agent availability and agent profiles, schedules, skills, handle time, and/or other relevant data. As another example, the storage device 114 may store interaction data in an interaction database. Interaction data may include, for example, data relating to numerous past interactions between customers and contact centers. More generally, it should be understood that, unless otherwise specified, the storage device 114 may be configured to include databases and/or store data related to any of the types of information described herein, with those databases and/or data being accessible to the other modules or servers of the contact center system 100 in ways that facilitate the functionality described herein. For example, the servers or modules of the contact center system 100 may query such databases to retrieve data stored therein or transmit data thereto for storage. The storage device 114, for example, may take the form of any conventional storage medium and may be locally housed or operated from a remote location. As an example, the databases may be Cassandra database, NoSQL database, or a SQL database and managed by a database management system, such as, Oracle, IBM DB2, Microsoft SQL server, or Microsoft Access, PostgreSQL.

The statistics server 116 may be configured to record and aggregate data relating to the performance and operational aspects of the contact center system 100. Such information may be compiled by the statistics server 116 and made available to other servers and modules, such as the reporting server 134, which then may use the data to produce reports that are used to manage operational aspects of the contact center and execute automated actions in accordance with functionality described herein. Such data may relate to the state of contact center resources, e.g., average wait time, abandonment rate, agent occupancy, and others as functionality described herein would require.

The agent devices 118 of the contact center system 100 may be communication devices configured to interact with the various components and modules of the contact center system 100 in ways that facilitate functionality described herein. An agent device 118, for example, may include a telephone adapted for regular telephone calls or VOIP calls. An agent device 118 may further include a computing device configured to communicate with the servers of the contact center system 100, perform data processing associated with operations, and interface with customers via voice, chat, email, and other multimedia communication mechanisms according to functionality described herein. Although FIG. 1 shows three such agent devices 118—i.e., agent devices 118A, 118B and 118C—it should be understood that any number of agent devices 118 may be present in a particular embodiment.

The multimedia/social media server 120 may be configured to facilitate media interactions (other than voice) with the customer devices 102 and/or the servers 128. Such media interactions may be related, for example, to email, voice mail, chat, video, text-messaging, web, social media, co-browsing, etc. The multimedia/social media server 120 may take the form of any IP router conventional in the art with specialized hardware and software for receiving, processing, and forwarding multi-media events and communications.

The knowledge management server 122 may be configured to facilitate interactions between customers and the knowledge system 124. In general, the knowledge system 124 may be a computer system capable of receiving questions or queries and providing answers in response. The knowledge system 124 may be included as part of the contact center system 100 or operated remotely by a third party. The knowledge system 124 may include an artificially intelligent computer system capable of answering questions posed in natural language by retrieving information from information sources such as encyclopedias, dictionaries, newswire articles, literary works, or other documents submitted to the knowledge system 124 as reference materials. As an example, the knowledge system 124 may be embodied as IBM Watson or a similar system.

The chat server 126, it may be configured to conduct, orchestrate, and manage electronic chat communications with customers. In general, the chat server 126 is configured to implement and maintain chat conversations and generate chat transcripts. Such chat communications may be conducted by the chat server 126 in such a way that a customer communicates with automated chatbots, human agents, or both. In exemplary embodiments, the chat server 126 may perform as a chat orchestration server that dispatches chat conversations among the chatbots and available human agents. In such cases, the processing logic of the chat server

126 may be rules driven so to leverage an intelligent workload distribution among available chat resources. The chat server 126 further may implement, manage, and facilitate user interfaces (UIs) associated with the chat feature, including those UIs generated at either the customer device 102 or the agent device 118. The chat server 126 may be configured to transfer chats within a single chat session with a particular customer between automated and human sources such that, for example, a chat session transfers from a chatbot to a human agent or from a human agent to a chatbot. The chat server 126 may also be coupled to the knowledge management server 122 and the knowledge systems 124 for receiving suggestions and answers to queries posed by customers during a chat so that, for example, links to relevant articles can be provided.

The web servers 128 may be included to provide site hosts for a variety of social interaction sites to which customers subscribe, such as Facebook, Twitter, Instagram, etc. Though depicted as part of the contact center system 100, it should be understood that the web servers 128 may be provided by third parties and/or maintained remotely. The web servers 128 may also provide webpages for the enterprise or organization being supported by the contact center system 100. For example, customers may browse the webpages and receive information about the products and services of a particular enterprise. Within such enterprise webpages, mechanisms may be provided for initiating an interaction with the contact center system 100, for example, via web chat, voice, or email. An example of such a mechanism is a widget, which can be deployed on the webpages or websites hosted on the web servers 128. As used herein, a widget refers to a user interface component that performs a particular function. In some implementations, a widget may include a graphical user interface control that can be overlaid on a webpage displayed to a customer via the Internet. The widget may show information, such as in a window or text box, or include buttons or other controls that allow the customer to access certain functionalities, such as sharing or opening a file or initiating a communication. In some implementations, a widget includes a user interface component having a portable portion of code that can be installed and executed within a separate webpage without compilation. Some widgets can include corresponding or additional user interfaces and be configured to access a variety of local resources (e.g., a calendar or contact information on the customer device) or remote resources via network (e.g., instant messaging, electronic mail, or social networking updates).

The interaction (iXn) server 130 may be configured to manage deferrable activities of the contact center and the routing thereof to human agents for completion. As used herein, deferrable activities may include back-office work that can be performed off-line, e.g., responding to emails, attending training, and other activities that do not entail real-time communication with a customer. As an example, the interaction (iXn) server 130 may be configured to interact with the routing server 112 for selecting an appropriate agent to handle each of the deferrable activities. Once assigned to a particular agent, the deferrable activity is pushed to that agent so that it appears on the agent device 118 of the selected agent. The deferrable activity may appear in a workbin as a task for the selected agent to complete. The functionality of the workbin may be implemented via any conventional data structure, such as, for example, a linked list, array, and/or other suitable data structure. Each of the agent devices 118 may include a workbin. As an example, a workbin may be maintained in the buffer memory of the corresponding agent device 118.

The universal contact server (UCS) 132 may be configured to retrieve information stored in the customer database and/or transmit information thereto for storage therein. For example, the UCS 132 may be utilized as part of the chat feature to facilitate maintaining a history on how chats with a particular customer were handled, which then may be used as a reference for how future chats should be handled. More generally, the UCS 132 may be configured to facilitate maintaining a history of customer preferences, such as preferred media channels and best times to contact. To do this, the UCS 132 may be configured to identify data pertinent to the interaction history for each customer such as, for example, data related to comments from agents, customer communication history, and the like. Each of these data types then may be stored in the customer database 222 or on other modules and retrieved as functionality described herein requires.

The reporting server 134 may be configured to generate reports from data compiled and aggregated by the statistics server 116 or other sources. Such reports may include near real-time reports or historical reports and concern the state of contact center resources and performance characteristics, such as, for example, average wait time, abandonment rate, and/or agent occupancy. The reports may be generated automatically or in response to specific requests from a requestor (e.g., agent, administrator, contact center application, etc.). The reports then may be used toward managing the contact center operations in accordance with functionality described herein.

The media services server 136 may be configured to provide audio and/or video services to support contact center features. In accordance with functionality described herein, such features may include prompts for an IVR or IMR system (e.g., playback of audio files), hold music, voicemails/single party recordings, multi-party recordings (e.g., of audio and/or video calls), screen recording, speech recognition, dual tone multi frequency (DTMF) recognition, faxes, audio and video transcoding, secure real-time transport protocol (SRTP), audio conferencing, video conferencing, coaching (e.g., support for a coach to listen in on an interaction between a customer and an agent and for the coach to provide comments to the agent without the customer hearing the comments), call analysis, keyword spotting, and/or other relevant features.

The analytics module 138 may be configured to provide systems and methods for performing analytics on data received from a plurality of different data sources as functionality described herein may require. In accordance with example embodiments, the analytics module 138 also may generate, update, train, and modify predictors or models based on collected data, such as, for example, customer data, agent data, and interaction data. The models may include behavior models of customers or agents. The behavior models may be used to predict behaviors of, for example, customers or agents, in a variety of situations, thereby allowing embodiments of the present invention to tailor interactions based on such predictions or to allocate resources in preparation for predicted characteristics of future interactions, thereby improving overall contact center performance and the customer experience. It will be appreciated that, while the analytics module is described as being part of a contact center, such behavior models also may be implemented on customer systems (or, as also used herein, on the "customer-side" of the interaction) and used for the benefit of customers.

According to exemplary embodiments, the analytics module 138 may have access to the data stored in the storage device 114, including the customer database and agent database. The analytics module 138 also may have access to the interaction database, which stores data related to interactions and interaction content (e.g., transcripts of the interactions and events detected therein), interaction metadata (e.g., customer identifier, agent identifier, medium of interaction, length of interaction, interaction start and end time, department, tagged categories), and the application setting (e.g., the interaction path through the contact center). Further, the analytic module 138 may be configured to retrieve data stored within the storage device 114 for use in developing and training algorithms and models, for example, by applying machine learning techniques.

One or more of the included models may be configured to predict customer or agent behavior and/or aspects related to contact center operation and performance. Further, one or more of the models may be used in natural language processing and, for example, include intent recognition and the like. The models may be developed based upon known first principle equations describing a system; data, resulting in an empirical model; or a combination of known first principle equations and data. In developing a model for use with present embodiments, because first principles equations are often not available or easily derived, it may be generally preferred to build an empirical model based upon collected and stored data. To properly capture the relationship between the manipulated/disturbance variables and the controlled variables of complex systems, in some embodiments, it may be preferable that the models are nonlinear. This is because nonlinear models can represent curved rather than straight-line relationships between manipulated/disturbance variables and controlled variables, which are common to complex systems such as those discussed herein. Given the foregoing requirements, a machine learning or neural network-based approach may be a preferred embodiment for implementing the models. Neural networks, for example, may be developed based upon empirical data using advanced regression algorithms.

The analytics module 138 may further include an optimizer. As will be appreciated, an optimizer may be used to minimize a "cost function" subject to a set of constraints, where the cost function is a mathematical representation of desired objectives or system operation. Because the models may be non-linear, the optimizer may be a nonlinear programming optimizer. It is contemplated, however, that the technologies described herein may be implemented by using, individually or in combination, a variety of different types of optimization approaches, including, but not limited to, linear programming, quadratic programming, mixed integer non-linear programming, stochastic programming, global non-linear programming, genetic algorithms, particle/swarm techniques, and the like.

According to some embodiments, the models and the optimizer may together be used within an optimization system. For example, the analytics module 138 may utilize the optimization system as part of an optimization process by which aspects of contact center performance and operation are optimized or, at least, enhanced. This, for example, may include features related to the customer experience, agent experience, interaction routing, natural language processing, intent recognition, or other functionality related to automated processes.

The various components, modules, and/or servers of FIG. 1 (as well as the other figures included herein) may each include one or more processors executing computer program instructions and interacting with other system components for performing the various functionalities described herein. Such computer program instructions may be stored in a memory implemented using a standard memory device, such as, for example, a random-access memory (RAM), or stored in other non-transitory computer readable media such as, for example, a CD-ROM, flash drive, etc. Although the functionality of each of the servers is described as being provided by the particular server, a person of skill in the art should recognize that the functionality of various servers may be combined or integrated into a single server, or the functionality of a particular server may be distributed across one or more other servers without departing from the scope of the present invention. Further, the terms "interaction" and "communication" are used interchangeably, and generally refer to any real-time and non-real-time interaction that uses any communication channel including, without limitation, telephone calls (PSTN or VoIP calls), emails, vmails, video, chat, screen-sharing, text messages, social media messages, WebRTC calls, etc. Access to and control of the components of the contact center system 100 may be affected through user interfaces (UIs) which may be generated on the customer devices 102 and/or the agent devices 118.

As noted above, in some embodiments, the contact center system 100 may operate as a hybrid system in which some or all components are hosted remotely, such as in a cloud-based or cloud computing environment. It should be appreciated that each of the devices of the contact center system 100 may be embodied as, include, or form a portion of one or more computing devices similar to the computing device 200 described below in reference to FIG. 2.

Referring now to FIG. 2, a simplified block diagram of at least one embodiment of a computing device 200 is shown. The illustrative computing device 200 depicts at least one embodiment of each of the computing devices, systems, servicers, controllers, switches, gateways, engines, modules, and/or computing components described herein (e.g., which collectively may be referred to interchangeably as computing devices, servers, or modules for brevity of the description). For example, the various computing devices may be a process or thread running on one or more processors of one or more computing devices 200, which may be executing computer program instructions and interacting with other system modules in order to perform the various functionalities described herein. Unless otherwise specifically limited, the functionality described in relation to a plurality of computing devices may be integrated into a single computing device, or the various functionalities described in relation to a single computing device may be distributed across several computing devices. Further, in relation to the computing systems described herein—such as the contact center system 100 of FIG. 1—the various servers and computer devices thereof may be located on local computing devices 200 (e.g., on-site at the same physical location as the agents of the contact center), remote computing devices 200 (e.g., off-site or in a cloud-based or cloud computing environment, for example, in a remote data center connected via a network), or some combination thereof. In some embodiments, functionality provided by servers located on computing devices off-site may be accessed and provided over a virtual private network (VPN), as if such servers were on-site, or the functionality may be provided using a software as a service (SaaS) accessed over the Internet using various protocols, such as by exchanging data via extensible markup language (XML), JSON, and/or the functionality may be otherwise accessed/leveraged.

In some embodiments, the computing device 200 may be embodied as a server, desktop computer, laptop computer, tablet computer, notebook, netbook, Ultrabook™, cellular phone, mobile computing device, smartphone, wearable computing device, personal digital assistant, Internet of Things (IoT) device, processing system, wireless access point, router, gateway, and/or any other computing, processing, and/or communication device capable of performing the functions described herein.

The computing device 200 includes a processing device 202 that executes algorithms and/or processes data in accordance with operating logic 208, an input/output device 204 that enables communication between the computing device 200 and one or more external devices 210, and memory 206 which stores, for example, data received from the external device 210 via the input/output device 204.

The input/output device 204 allows the computing device 200 to communicate with the external device 210. For example, the input/output device 204 may include a transceiver, a network adapter, a network card, an interface, one or more communication ports (e.g., a USB port, serial port, parallel port, an analog port, a digital port, VGA, DVI, HDMI, Fire Wire, CAT 5, or any other type of communication port or interface), and/or other communication circuitry. Communication circuitry of the computing device 200 may be configured to use any one or more communication technologies (e.g., wireless or wired communications) and associated protocols (e.g., Ethernet, Bluetooth®, Wi-Fi®, WiMAX, etc.) to effect such communication depending on the particular computing device 200. The input/output device 204 may include hardware, software, and/or firmware suitable for performing the techniques described herein.

The external device 210 may be any type of device that allows data to be inputted or outputted from the computing device 200. For example, in various embodiments, the external device 210 may be embodied as one or more of the devices/systems described herein, and/or a portion thereof. Further, in some embodiments, the external device 210 may be embodied as another computing device, switch, diagnostic tool, controller, printer, display, alarm, peripheral device (e.g., keyboard, mouse, touch screen display, etc.), and/or any other computing, processing, and/or communication device capable of performing the functions described herein. Furthermore, in some embodiments, it should be appreciated that the external device 210 may be integrated into the computing device 200.

The processing device 202 may be embodied as any type of processor(s) capable of performing the functions described herein. In particular, the processing device 202 may be embodied as one or more single or multi-core processors, microcontrollers, or other processor or processing/controlling circuits. For example, in some embodiments, the processing device 202 may include or be embodied as an arithmetic logic unit (ALU), central processing unit (CPU), digital signal processor (DSP), graphics processing unit (GPU), field-programmable gate array (FPGA), application-specific integrated circuit (ASIC), and/or another suitable processor(s). The processing device 202 may be a programmable type, a dedicated hardwired state machine, or a combination thereof. Processing devices 202 with multiple processing units may utilize distributed, pipelined, and/or parallel processing in various embodiments. Further, the processing device 202 may be dedicated to performance of just the operations described herein, or may be utilized in one or more additional applications. In the illustrative embodiment, the processing device 202 is programmable and executes algorithms and/or processes data in accordance with operating logic 208 as defined by programming instructions (such as software or firmware) stored in memory 206. Additionally or alternatively, the operating logic 208 for processing device 202 may be at least partially defined by hardwired logic or other hardware. Further, the processing device 202 may include one or more components of any type suitable to process the signals received from input/output device 204 or from other components or devices and to provide desired output signals. Such components may include digital circuitry, analog circuitry, or a combination thereof.

The memory 206 may be of one or more types of non-transitory computer-readable media, such as a solid-state memory, electromagnetic memory, optical memory, or a combination thereof. Furthermore, the memory 206 may be volatile and/or nonvolatile and, in some embodiments, some or all of the memory 206 may be of a portable type, such as a disk, tape, memory stick, cartridge, and/or other suitable portable memory. In operation, the memory 206 may store various data and software used during operation of the computing device 200 such as operating systems, applications, programs, libraries, and drivers. It should be appreciated that the memory 206 may store data that is manipulated by the operating logic 208 of processing device 202, such as, for example, data representative of signals received from and/or sent to the input/output device 204 in addition to or in lieu of storing programming instructions defining operating logic 208. As shown in FIG. 2, the memory 206 may be included with the processing device 202 and/or coupled to the processing device 202 depending on the particular embodiment. For example, in some embodiments, the processing device 202, the memory 206, and/or other components of the computing device 200 may form a portion of a system-on-a-chip (SoC) and be incorporated on a single integrated circuit chip.

In some embodiments, various components of the computing device 200 (e.g., the processing device 202 and the memory 206) may be communicatively coupled via an input/output subsystem, which may be embodied as circuitry and/or components to facilitate input/output operations with the processing device 202, the memory 206, and other components of the computing device 200. For example, the input/output subsystem may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations.

The computing device 200 may include other or additional components, such as those commonly found in a typical computing device (e.g., various input/output devices and/or other components), in other embodiments. It should be further appreciated that one or more of the components of the computing device 200 described herein may be distributed across multiple computing devices. In other words, the techniques described herein may be employed by a computing system that includes one or more computing devices. Additionally, although only a single processing device 202, I/O device 204, and memory 206 are illustratively shown in FIG. 2, it should be appreciated that a particular computing device 200 may include multiple processing devices 202, I/O devices 204, and/or memories 206 in other embodiments. Further, in some embodiments, more than one external device 210 may be in communication with the computing device 200.

The computing device 200 may be one of a plurality of devices connected by a network or connected to other systems/resources via a network. The network may be embodied as any one or more types of communication networks that are capable of facilitating communication between the various devices communicatively connected via the network. As such, the network may include one or more networks, routers, switches, access points, hubs, computers, client devices, endpoints, nodes, and/or other intervening network devices. For example, the network may be embodied as or otherwise include one or more cellular networks, telephone networks, local or wide area networks, publicly available global networks (e.g., the Internet), ad hoc networks, short-range communication links, or a combination thereof. In some embodiments, the network may include a circuit-switched voice or data network, a packet-switched voice or data network, and/or any other network able to carry voice and/or data. In particular, in some embodiments, the network may include Internet Protocol (IP)-based and/or asynchronous transfer mode (ATM)-based networks. In some embodiments, the network may handle voice traffic (e.g., via a Voice over IP (VOIP) network), web traffic, and/or other network traffic depending on the particular embodiment and/or devices of the system in communication with one another. In various embodiments, the network may include analog or digital wired and wireless networks (e.g., IEEE 802.11 networks, Public Switched Telephone Network (PSTN), Integrated Services Digital Network (ISDN), and Digital Subscriber Line (xDSL)), Third Generation (3G) mobile telecommunications networks, Fourth Generation (4G) mobile telecommunications networks, Fifth Generation (5G) mobile telecommunications networks, a wired Ethernet network, a private network (e.g., such as an intranet), radio, television, cable, satellite, and/or any other delivery or tunneling mechanism for carrying data, or any appropriate combination of such networks. It should be appreciated that the various devices/systems may communicate with one another via different networks depending on the source and/or destination devices/systems.

It should be appreciated that the computing device 200 may communicate with other computing devices 200 via any type of gateway or tunneling protocol such as secure socket layer or transport layer security. The network interface may include a built-in network adapter, such as a network interface card, suitable for interfacing the computing device to any type of network capable of performing the operations described herein. Further, the network environment may be a virtual network environment where the various network components are virtualized. For example, the various machines may be virtual machines implemented as a software-based computer running on a physical machine. The virtual machines may share the same operating system, or, in other embodiments, different operating system may be run on each virtual machine instance. For example, a "hypervisor" type of virtualizing is used where multiple virtual machines run on the same host physical machine, each acting as if it has its own dedicated box. Other types of virtualization may be employed in other embodiments, such as, for example, the network (e.g., via software defined networking) or functions (e.g., via network functions virtualization).

Accordingly, one or more of the computing devices 200 described herein may be embodied as, or form a portion of, one or more cloud-based systems. In cloud-based embodiments, the cloud-based system may be embodied as a server-ambiguous computing solution, for example, that executes a plurality of instructions on-demand, contains logic to execute instructions only when prompted by a particular activity/trigger, and does not consume computing resources when not in use. That is, system may be embodied as a virtual computing environment residing "on" a computing system (e.g., a distributed network of devices) in which various virtual functions (e.g., Lambda functions, Azure functions, Google cloud functions, and/or other suitable virtual functions) may be executed corresponding with the functions of the system described herein. For example, when an event occurs (e.g., data is transferred to the system for handling), the virtual computing environment may be communicated with (e.g., via a request to an API of the virtual computing environment), whereby the API may route the request to the correct virtual function (e.g., a particular server-ambiguous computing resource) based on a set of rules. As such, when a request for the transmission of data is made by a user (e.g., via an appropriate user interface to the system), the appropriate virtual function(s) may be executed to perform the actions before eliminating the instance of the virtual function(s).

As described herein, the contact center system 100 provides mechanisms for the administrator of the contact center to configure each of the outbound dialing campaigns of the contact center via a graphical user interface. In doing so, as described herein, it should be appreciated that each of the outbound dialing campaigns may be assigned a number of fixed/reserved lines or be assigned a weight to be used in distributing the remaining non-fixed lines (e.g., proportionally based on the respective weights of the line balanced outbound dialing campaigns. For example, FIGS. 3-4 illustrate a graphical user interface for depicting outbound line distribution for a particular site.

Figure 3:
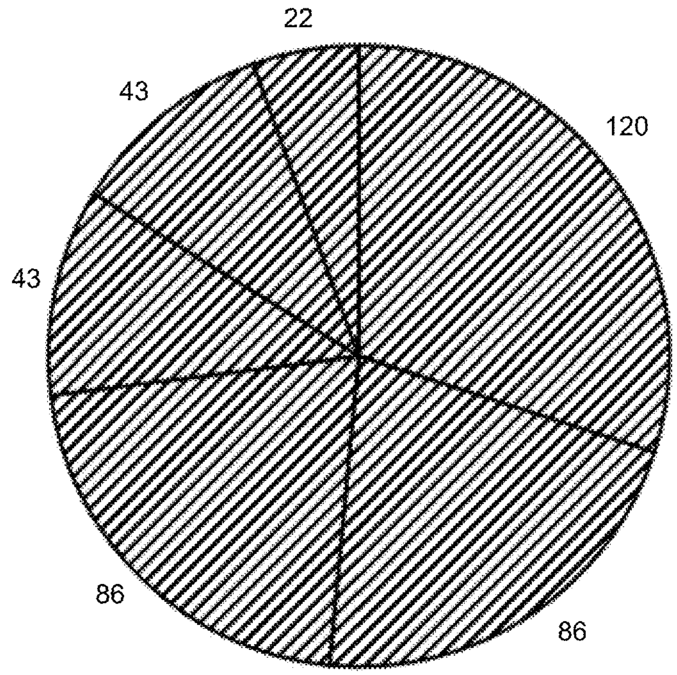
FIGS. 3-4 illustrate a graphical user interface for depicting outbound line distribution for a site.
Figure 4:
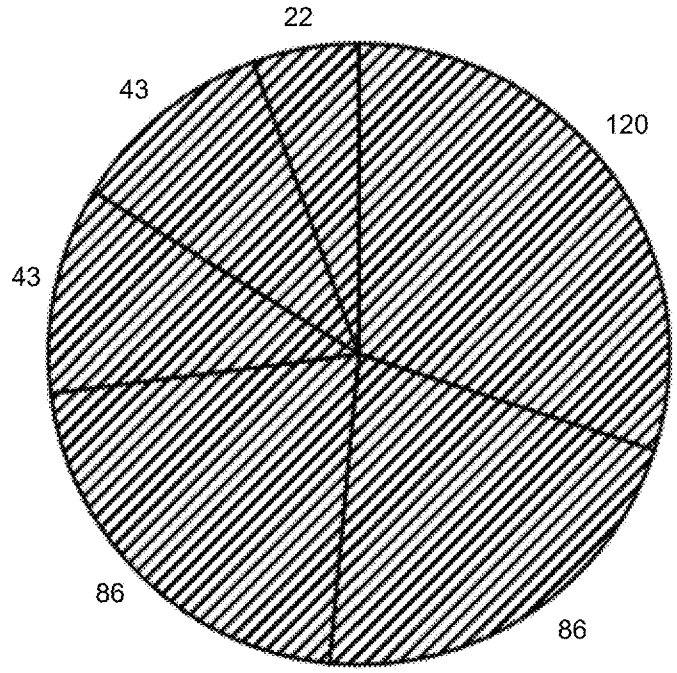

Referring now to FIGS. 3-4, the graphical user interface indicates that the total number of telephony lines available for distribution is 400 telephony lines. As shown in FIG. 4, the administrator has configured three campaigns to have a corresponding number of fixed/reserved lines. More specifically, 50 telephony lines have been reserved for Campaign-007, 20 telephony lines have been reserved for Campaign-008, and 50 telephony lines have been reserved for Campaign-006. Therefore, the total number of reserved telephony lines is 120 telephony lines, which is depicted in a representative pie graph on the graphical user interface. As shown in FIG. 3, the administrator has configured the remaining five outbound dialing campaigns to have respective weights for balanced distribution (e.g., proportional line allocation based on weights) of the remaining 280 telephony lines. More specifically, Campaign-001 has been assigned a weight of 40, which corresponds with 86 of the 280 available telephony lines; Campaign-005 has been assigned a weight of 40, which corresponds with 86 of the 280 available telephony lines; Campaign-003 has been assigned a weight of 20, which corresponds with 43 of the 280 available telephony lines; Campaign-004 has been assigned a weight of 20, which corresponds with 43 of the 280 available telephony lines; and Campaign-002 has been assigned a weight of 10, which corresponds with 22 of the 280 available telephony lines. As such, Campaign-001 has been dynamically assigned 86 lines, Campaign-005 has been dynamically assigned 86 lines, Campaign-003 has been dynamically assigned 43 lines, Campaign-004 has been dynamically assigned 43 lines, and Campaign-002 has been dynamically assigned 22 lines, each of which is depicted in a representative pie graph on the graphical user interface.

In other words, in various embodiments, an administrator of the contact center may assign/reserve a fixed number of telephony lines for a particular outbound dialing campaign or the administrator may assign a weight to the particular outbound dialing campaign, which is used to dynamically balance the distribution of the telephony lines based on the respective weights of each line balanced outbound dialing campaign. For example, some campaigns may be higher priority campaigns than others and, therefore, the administrator may want the outbound dialing for that campaign to occur more quickly than a lower priority campaign. In particular, an outbound dialing campaign related to a system outage may have higher priority than an outbound dialing campaign related to a new client solicitation. Accordingly, the administrator may assign a weight to each campaign that may be used to indicate the relative number of telephony lines that should be assigned to that campaign. For example, in some embodiments, each weight may be an integer value between 0 and 100, whereas in other embodiments, different values/ranges may be used for the weights.

In an example, suppose there are 100 telephony lines to be dynamically distributed to two campaigns and each of the two campaigns has been assigned a weight of 20. In that case, the contact center system assigns 50 telephony lines to each of those campaigns. In another example, suppose there are 100 telephony lines to be dynamically distributed to two campaigns, with the first campaign being assigned a weight of 10 and the second campaign being assigned a weight of 20. In that case, the contact center system assigns one third of the telephony lines (e.g., 33) to the first campaign and two thirds of the telephony lines (e.g., 67) to the second campaign. Similarly, in the case in which the first campaign was assigned a weight of 30 and the second campaign was assigned a weight of 60, the contact center system would likewise assign one third of the telephony lines to the first campaign and two thirds of the telephony lines to the second campaign.

Further, it should be appreciated that a particular outbound dialing campaign only consumes telephony lines when it is running. Accordingly, in some embodiments, when a particular campaign is not running, the telephony lines allocated to that campaign (e.g., as reserved lines or as dynamically assigned via weights) may be dynamically distributed to the campaigns that are running. For example, in the example described above in which the first campaign has been assigned a weight of 10 and the second campaign assigned a weight of 20, if the second campaign is not running, then the 67 telephony lines that were assigned to the second campaign may be re-assigned to the first campaign such that the first campaign now has been assigned all 100 telephony lines. Then, if the second campaign resumes, the telephony lines may again be rebalanced by distributing the lines according to the respective weights (e.g., re-assigning two thirds (e.g., 67) of the 100 telephony lines from the first campaign to the second campaign). In other words, it should be appreciated that the assignment of telephony lines to the various campaigns is dynamic and may be performed in real time based on the circumstances of the contact center and/or based on modifications by the administrator (e.g., to reserved lines and/or weights).

As described herein, in some embodiments, telephony lines may be reserved for one or more campaigns irrespective of weight configurations. For example, in an embodiment, an administrator may have a high priority campaign and want the campaign to consume a fixed number of telephony lines (e.g., 50 lines) whenever the campaign is running. In such embodiments, the reserved lines may be removed from the pool of telephony lines to be dynamically distributed to the other campaigns based on weights. For example, suppose the example described above also included a third campaign, for which 50 telephony lines have been reserved. In that case, the remaining 50 telephony lines would be dynamically distributed to the first and second campaigns. In particular, the first campaign would receive one third of the remaining 50 telephony lines and the second campaign would receive two thirds of the remaining 50 telephony lines. In circumstances in which no fixed lines and/or weight is assigned to particular campaign (e.g., a legacy campaign), the contact center system may distribute the telephony lines equally among those campaigns.

As described herein, it should be appreciated that the telephony lines may be dynamically distributed at the outset but also may be dynamically distributed or rebalanced over time based on various conditions or circumstances associated with the contact center. For example, in some embodiments, the contact center system 100 may determine that a campaign is "running low" on the number of contacts to call in which case the system 100 may reassign one or more of the telephony lines currently assigned to that campaign. It should be appreciated that with certain modes of skill-based dialing, an available agent must have a certain skill (or set of skills) in order to take a call before the outbound call is even placed. Therefore, when the agent pool has "run out of" agents with skills needed to place the call, the campaign is effectively halted as there is no agent to take a call. In those circumstances, the campaign is technically running with allocated telephony lines, but no call can actually be placed. Accordingly, in some embodiments, the contact center system 100 may detect such a "low contact" scenario (e.g., based on a campaign condition as described herein) and have the system 100 rebalance itself (e.g., reallocating telephony lines to the general pool). Further, in some embodiments, instead of reallocating all of the telephony lines, a fixed number of telephony lines (e.g., 10) may be reserved for the "low contact" campaign just in case an agent with the proper skillset comes online and is able to handle a call, and the remaining previously allocated lines may be released.

In some embodiments, the administrator of the contact center may establish campaign rules that further function to dynamically distribute the telephony lines in real time based on various conditions (e.g., based on a defined condition and corresponding action). The corresponding actions that occur in response to a predefined condition may include, for example, setting the campaign weight or setting a number of reserved lines for a particular campaign. The campaign conditions defined by the administrator may vary depending on the particular embodiment (e.g., based on the particular circumstances of the contact center and/or campaign itself). In some embodiments, a campaign condition may be based on or associated with a current time and/or a current day. For example, if it is known that all of the agents may log out of a campaign during the lunch hour, then a campaign condition may be configured to set the campaign's weight to zero at a particular time/day (e.g., the start of a lunch hour). In doing so, when the lunch hour begins, the campaign condition is satisfied and by setting the weight to zero, the telephony lines previously dynamically assigned to that campaign are released to the pool for dynamic reallocation to the other campaigns. Another campaign condition may be configured to reset the weight to a nonzero value at the end of the lunch hour, such that telephony lines are reallocated to the campaign based on the assigned weight when the agents return from the lunch hour.

It should be appreciated that various other campaign conditions may be used depending on the particular embodiment. For example, in some embodiments, a campaign condition may be associated with a number of contacts called by a respective outbound dialing campaign. In another embodiment, a campaign condition may be associated with a number of successful outcomes, a number of failed outcomes, and/or a number of neutral outcomes achieved by the outbound dialing campaign. It should be appreciated that the definition of a "successful," "failed," and "neutral" outcome may be domain-specific and, therefore, each contact center may define the criteria under which an outcome may be deemed successful, failed, or neutral. In some embodiments, a campaign condition may be associated with a number of right party contacts achieved by the outbound dialing campaign. It should be appreciated that a right party contact (RPC) occurs when an answer is detected and it has been confirmed that the person intended to be reached was indeed reached (e.g., when placing a call to one member of a household, that particular member of the household was reached and not some other party living in the same household). In some embodiments, a campaign condition may be associated with an absolute number or percentage of valid attempts to reach a contact by the outbound dialing campaign. In some embodiments, a campaign condition may be associated with a number of contact center agents currently available to handle outbound calls for the campaign. In some embodiments, a campaign condition may be associated with a number of records remaining in the campaign. It should be appreciated that, in some embodiments, multiple campaign conditions may be used in combination with one another (e.g., via Boolean AND/OR operations or otherwise) in order to establish more complex campaign conditions.

Figure 5:
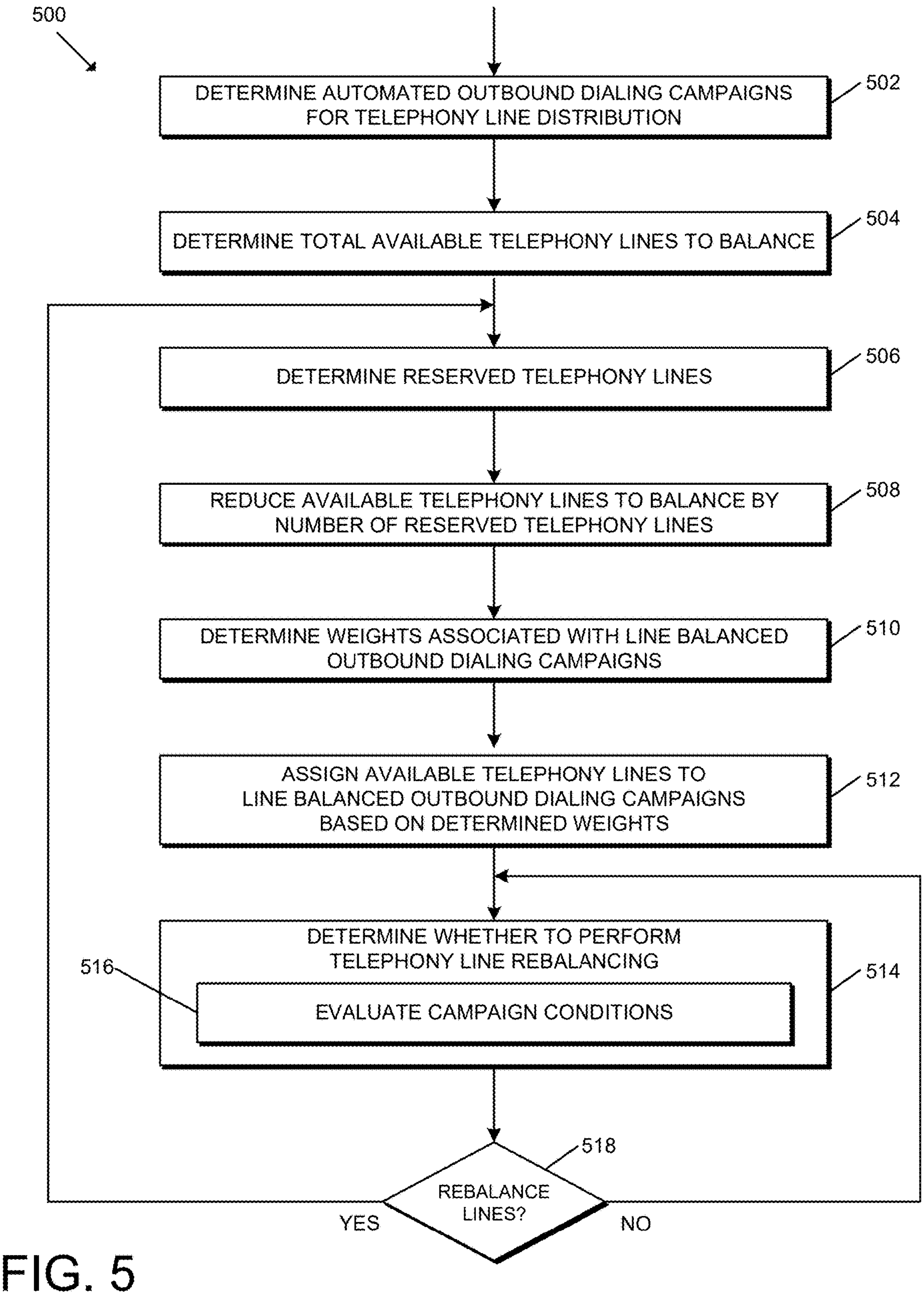
FIG. 5 is a simplified flow diagram of at least one embodiment of a method for dynamic telephony line balancing for automated outbound dialing.

Referring now to FIG. 5, in use, the contact center system 100 may execute a method 500 for dynamic telephony line balancing for automated outbound dialing. It should be appreciated that the particular blocks of the method 500 are illustrated by way of example, and such blocks may be combined or divided, added or removed, and/or reordered in whole or in part depending on the particular embodiment, unless stated to the contrary.

The illustrative method 500 begins with block 502 in which the contact center system 100 determines which automated outbound dialing campaigns are to participate in the dynamic telephony line distribution. In block 504, the contact center system 100 determines the total number of available telephony lines to be dynamically balanced among the automated outbound dialing campaigns. In block 506, the contact center system 100 determines the number of telephony lines (i.e., of the total number of available telephony lines) to be reserved for the outbound dialing campaigns. For example, in the example depicted in FIG. 4, the contact center system 100 had 400 total telephony lines available for distribution, of which the contact center system 100 reserved 120 telephony lines (50 lines for Campaign-007, 20 lines for Campaign-008, and 50 lines for Campaign-006). Accordingly, in the illustrative embodiment, the number of telephony lines to be reserved is nonzero; however, it should be appreciated that in other embodiments, no telephony lines are reserved. Further, in some embodiments, each of multiple outbound dialing campaigns may be assigned a respective number of fixed telephony lines.

In block 508, the contact center system 100 reduces the total number of available telephony lines to be dynamically balanced by the number of telephony lines reserved for the outbound dialing campaigns (if any). In block 510, the contact center system 100 determines a respective dynamic balancing weight assigned to each outbound dialing campaign that is to be line balanced (i.e., that does not have an assigned fixed number of telephony lines). In block 512, as described above, the contact center system 100 assigns the available telephony lines to the line balanced outbound dialing campaigns based on their respective weights. As described above, the available telephony lines may be assigned proportionally based on their assigned weights. For example, if there are 100 telephony lines available for dynamic distribution, a first campaign has been assigned a weight of X (e.g., X=20), and a second campaign has been assigned a weight of 2*X (e.g., 2*X=40), then the second campaign is assigned twice as many telephony lines as the first campaign. That is, the first campaign may be assigned one third of the telephony lines (e.g., 33) and the second campaign may be assigned two thirds of the telephony lines (e.g., 67). In another embodiment, suppose the first campaign has been assigned a weight of X (e.g., X=5), and a second campaign has been assigned a weight of 3*X (e.g., 3*X=15), then the second campaign is assigned three times as many telephony lines as the first campaign. That is, the first campaign may be assigned one fourth of the telephony lines (e.g., 25) and the second campaign may be assigned three fourths of the telephony lines (e.g., 75).

In block 514, the contact center system 100 determines whether to perform telephony line rebalancing. For example, in some embodiments, the contact center system 100 may determine whether to perform telephony line rebalancing based on one or more campaign conditions of the outbound dialing campaigns and therefore, in block 516, the contact center system 100 may evaluate those campaign conditions. As described above, the campaign conditions may vary depending on the particular embodiment and the corresponding action may include, for example, modifying the dynamic balancing weight assigned to a particular outbound dialing campaign and/or modifying the number of telephony lines to be reserved for a particular outbound dialing campaign. In doing so, it should be appreciated that the particular telephony lines for which a weight has been assigned and/or for which a number of telephony lines has been reserved/fixed may change over time.

In block 518, the contact center system 100 determines whether to rebalance the telephony lines. If not, the method 500 returns to block 514 in which the contact center system 100 continues to evaluate the campaign conditions to determine if/when to dynamically rebalance the telephony lines across the campaigns. However, if the contact center system 100 determines, in block 518, to rebalance the telephony lines, the method 500 returns to block 506 in which the contact center system 100 determines how many and for which campaign to reserved telephony lines. In other words, the contact center system 100 rebalances the assignments of the telephony lines to the outbound dialing campaigns based on the various campaign conditions and associated actions.

Although the blocks 502-518 are described in a relatively serial manner, it should be appreciated that various blocks of the method 500 may be performed in parallel in some embodiments.

It should be appreciated that the contact center system 100 may place outbound calls on behalf of contact center agents (e.g., via automated outbound dialing) to contacts identified by the outbound dialing campaigns using the respective assigned telephony lines. It should be further appreciated that, in some embodiments, one or more outputs (e.g., the telephony line assignments) of the method 500 may be used as inputs in a pacing algorithm for a particular contact center agent.

What is claimed is:

1. A method for dynamic telephony line balancing for automated outbound dialing, the method comprising:

determining, by a contact center system, a total number of available telephony lines of the contact center system to be dynamically balanced among a plurality of outbound dialing campaigns simultaneously executing on the contact center system for automated outbound dialing by the contact center system;

determining, by the contact center system, a number of the available telephony lines of the total number of available telephony lines to be reserved for one or more of the plurality of outbound dialing campaigns based on administrator-configured fixed line allocations for the one or more outbound dialing campaigns;

reducing, by the contact center system, the total number of available telephony lines to be dynamically balanced by the number of telephony lines to be reserved for the one or more outbound dialing campaigns thereby resulting in a remaining number of available telephony lines;

determining, by the contact center system and for each line balanced outbound dialing campaign of the plurality of outbound dialing campaigns, a dynamic balancing weight assigned to the respective line balanced outbound dialing campaign;

assigning, by the contact center system and for each line balanced outbound dialing campaign of the plurality of outbound dialing campaigns, a respective number of the remaining number of available telephony lines to the respective line balanced outbound dialing campaign proportionally based on the dynamic balancing weight assigned to the respective line balanced outbound dialing campaign relative to the dynamic balancing weights assigned to the other line balanced outbound dialing campaigns; and automatically placing, by the contact center system, outbound calls on behalf of contact center agents to contacts identified by the plurality of outbound dialing campaigns using the respective assigned telephony lines.

2. The method of claim 1, wherein determining the number of telephony lines of the total number of available telephony lines to be reserved for the one or more outbound dialing campaigns comprises determining, for each fixed line outbound dialing campaign of the plurality of outbound dialing campaigns, a respective number of telephony lines to reserve for the respective fixed line outbound dialing campaign.

3. The method of claim 1, wherein the number of telephony lines to be reserved for the one or more outbound dialing campaigns is nonzero.

4. The method of claim 1, further comprising:

determining, by the contact center system, whether to perform telephony line rebalancing based on one or more campaign conditions of the plurality of outbound dialing campaigns; and rebalancing, by the contact center system, assignments of the total number of the available telephony lines to the plurality of the outbound dialing campaigns in response to determining to perform telephony line rebalancing.

5. The method of claim 4, wherein the one or more campaign conditions include a campaign condition associated with a current time and/or a current day.

6. The method of claim 4, wherein the one or more campaign conditions include a campaign condition associated with a number of contacts called by a respective outbound dialing campaign of the plurality of outbound dialing campaigns.

7. The method of claim 4, wherein the one or more campaign conditions include a campaign condition associated with a number of one of successful outcomes, failed outcomes, or neutral outcomes achieved by a respective outbound dialing campaign of the plurality of outbound dialing campaigns.

8. The method of claim 4, wherein the one or more campaign conditions include a campaign condition associated with a number of contact center agents currently available to handle outbound calls for one or more of the plurality of outbound dialing campaigns.

9. The method of claim 4, wherein rebalancing the assignments of the total number of the available telephony lines to the plurality of the outbound dialing campaigns comprises modifying at least one dynamic balancing weight of a respective outbound dialing campaign of the plurality of outbound dialing campaigns.

10. The method of claim 4, wherein rebalancing the assignments of the total number of the available telephony lines to the plurality of the outbound dialing campaigns comprises modifying the number of telephony lines of the total number of available telephony lines to be reserved for the one or more outbound dialing campaigns of the plurality of outbound dialing campaigns.

11. The method of claim 4, wherein rebalancing the assignments of the total number of the available telephony lines to the plurality of the outbound dialing campaigns comprises modifying the one or more outbound dialing campaigns of the plurality of outbound dialing campaigns for which the number of telephony lines of the total number of available telephony lines are to be reserved.

12. The method of claim 1, wherein the dynamic balancing weight assigned to the respective line balanced outbound dialing campaign is modifiable by an administrator of the contact center system for each of the plurality of outbound dialing campaigns.

13. The method of claim 1, wherein the number of telephony lines reserved for each of the plurality of outbound dialing campaigns is modifiable by an administrator of the contact center system.

14. A contact center system for dynamic telephony line balancing for automated outbound dialing, the system comprising:

at least one processor; and at least one memory comprising a plurality of instructions stored thereon that, in response to execution by the at least one processor, causes the contact center system to:

determine a total number of available telephony lines of the contact center system to be dynamically balanced among a plurality of outbound dialing campaigns simultaneously executing on the contact center system for automated outbound dialing by the contact center system;

determine a number of telephony lines of the total number of the available telephony lines to be reserved for one or more of the plurality of outbound dialing campaigns based on administrator-configured fixed line allocations for the one or more outbound dialing campaigns;

reduce the total number of available telephony lines to be dynamically balanced by the number of telephony lines to be reserved for the one or more outbound dialing campaigns thereby resulting in a remaining number of available telephony lines;

determine, for each line balanced outbound dialing campaign of the plurality of outbound dialing campaigns, a dynamic balancing weight assigned to the respective line balanced outbound dialing campaign;

assign, for each line balanced outbound dialing campaign of the plurality of outbound dialing campaigns, a respective number of the remaining number of available telephony lines to the respective line balanced outbound dialing campaign proportionally based on the dynamic balancing weight assigned to the respective line balanced outbound dialing campaign relative to the dynamic balancing weights assigned to the other line balanced outbound dialing campaigns; and automatically place outbound calls on behalf of contact center agents to contacts identified by the plurality of outbound dialing campaigns using the respective assigned telephony lines.

15. The contact center system of claim 14, wherein to determine the number of telephony lines of the total number of available telephony lines to be reserved for the one or more outbound dialing campaigns comprises to determine, for each fixed line outbound dialing campaign of the plurality of outbound dialing campaigns, a respective number of telephony lines to reserve for the respective fixed line outbound dialing campaign.

16. The contact center system of claim 14, wherein the plurality of instructions further causes the contact center system to:

determine whether to perform telephony line rebalancing based on one or more campaign conditions of the plurality of outbound dialing campaigns; and rebalance assignments of the total number of the available telephony lines to the plurality of the outbound dialing campaigns in response to a determination to perform telephony line rebalancing.

17. The contact center system of claim 16, wherein to rebalance the assignments of the total number of the available telephony lines to the plurality of the outbound dialing campaigns comprises to modify at least one dynamic balancing weight of a respective outbound dialing campaign of the plurality of outbound dialing campaigns.

* * * * *